Patented Nov. 14, 1939

2,179,762

UNITED STATES PATENT OFFICE 2,179,762

PROCESS OF COLORING FRUIT

Longfield Longfield-Smith, Babson Park, Fla., assignor to Mrs. B. C. Skinner, Dunedin, Fla.

No Drawing. Application September 13, 1937, Serial No. 163,679

2 Claims. (Cl. 99—103)

This invention relates to the now common and necessary practice of adding color to fresh citrus fruits to enhance the varietal color, particularly of fruits which are deficient in color, although chemically mature.

An extensively employed process for coloring citrus fruits is disclosed in the patent to Harvey, No. 1,909,860, granted May 16, 1933, which comprises dissolving a suitable food color such as Yellow AB or Yellow OB in a suitable solvent which is insoluble in water, and forming an emulsion by mixing said solution with an aqueous solution of soap and applying it to the citrus fruits in any suitable manner as by immersion or spraying.

The function of the soap emulsion is to lower the surface tension so as to readily wet the surface of the fruit, the mutual solubility of the solvent of the dye with the oil in the cells of the fruit skin being relied upon for the transfer of the color from the emulsion to the fruit. One of the drawbacks of this process is that it must be carried out at a relatively high temperature, for example, 110° F. to 120° F. Subjection of the fruit to a temperature within this range has the tendency to wilt the fruit and impairs its keeping qualities.

Another disadvantage of the Harvey process in practice is that the dye content in the emulsion becomes progressively depleted so that it is necessary continually to add more dye solution or to lengthen the time of immersion or spraying, with successive batches of fruit.

The present invention has for its principal object to provide a process for adding color to citrus fruits which can be practically performed at a temperature of approximately 90° F.

Another object of the invention is the provision of a process for adding color to citrus fruits in which the liquid which is directly concerned in the transfer of color from the spray or bath to the fruit maintains its maximum concentration of dye until the bath or spray becomes substantially entirely depleted.

Other objects of the invention will appear as the following description of the process proceeds.

In carrying out the present invention, the process of Harvey is followed to the extent that a food dye such as Yellow AB or OB or other oil-soluble dye is dissolved in an oil or liquid such as chloroform or carbon tetrachloride which is insoluble in water. From this point the process is different in that Harvey emulsifies the oil dye solution and applies it to the fruit while in the present invention, an intermediary agent is introduced in the form of an auxiliary solvent which on the one hand dissolves in whole or in part the oil-soluble dye, and on the other hand is wholly or partially soluble in water.

The mixed solution of the two types of solvent and the dye is further mixed with an aqueous soap solution and in view of the solubility of one of the dye solvents in water, the mixture is a true solution and not an emulsion and in this sense also it distinguishes from the Harvey process. This solution may be termed the cold color concentrate. For use it is diluted with water. The addition of water causes the formation of a very fine emulsion. This reacts in a peculiar manner. The emulsion consists of minute droplets of the mixed solvents with the dye solute, which have been precipitated out of the water, and of a solution of the water with a large proportion of the dye and also of the solvents. In this respect the emulsion of the present invention distinguishes from that of the Harvey process for in Harvey practically none of the dye is carried in the aqueous content of the emulsion, but all of it in the water-insoluble content while in the present invention it is the aqueous solution from which the dye is directly transferred to the citrus fruit. The droplets of dye-laden solvents which are suspended in the aqueous part of the solution function as reservoirs, and automatically as color passes from the aqueous part of the emulsion to the fruit, said aqueous part is replenished with color which dissolves out of the minute droplets into the aqueous solution. Thus the dye-strength of the aqueous portion of the emulsion is kept at its working maximum until the droplets of dye solvents have themselves become practically depleted. This results in uniform coloration of successive batches and shortens the dyeing period since the color concentration of the solution is always at its maximum.

Referring more specifically to the process of the present invention, I have found that all of the chlorinated saturated or unsaturated derivatives of the aliphatic, alicyclic or aromatic hydrocarbons can be used as the oil-soluble water-insoluble dye solvents. In practice, chloroform, carbon tetrachloride, dichlorethane, trichlorethane, tetrachlorethane, pentachlorethane, dichlorethylene, trichlorethylene, perchlorethylene and dichlorobenzene have been tested. On account of their high volatility, chloroform, carbon tetrachloride, dichlorethylene and dichlorethane are considered at the present time ineligible for practical use.

For an oil-soluble, water-soluble solvent, I have tried butanol, ethers of mono-ethylene glycol, ethers of di-ethylene glycol, cyclohexanol and di-acetone alcohol. Ethyl and propyl alcohols are also workable in the process, but the boiling points of these alcohols are too low for practical purposes and on account of their high volatility they create a fire hazard.

The relative quantities of the two types of solvent employed is of some importance. It has been found that the best results follow from using about equal volumes of water-insoluble solvent and of the water-soluble or partially water-soluble solvent. In making up a batch of the color bath liquid, the dye is dissolved in the mixed solvents and then an aqueous soap solution containing 20 to 25 percent of soap is added and the mixture gently heated to about 130° F. and well stirred. The following is a practical formula which has been already put into use:

| | Parts by weight |
|---|---|
| Perchlorethylene | 300 |
| Cyclohexanol | 200 |
| Dye | 30 to 50 |
| Soap solution containing 20 to 25 percent soap | 750 to 800 |

This concentrate is transparent, red colored, thick, somewhat jelly-like, and it is not an emulsion but a true solution.

One part of this concentrate is added to 40 or 50 parts of water. This forms an emulsion which is used to color the fruit. Five minutes immersion at 90° F. is usually sufficient to impart a good color. The emulsion consists of minute droplets of solvents containing dye, which have been precipitated out, suspended in an aqueous solution which is also red in color and carries a large proportion of the dye and also of the solvents. It is the dye dissolved in the aqueous solution which is chiefly responsible for the coloring. As fast as color is removed by the fruit from this solution, fresh droplets of the dye-containing solvents pass into the aqueous solution to keep up the dyeing strength.

It is the three solvent system of the present process which enables the transfer of color to the fruit at low temperatures. First, there is the solvent for the dye which is insoluble in water. Second, there is a solvent for the dye which is both soluble in the first solvent and at least partially soluble in the aqueous solution of soap which forms the third solvent. Third, there is the aqueous solution of soap, which is the surface tension reducing agent, a solvent for the mixed first and second dye solutions, and which with said first and second dye solutions forms a solution which partly emulsifies and partly dissolves in the presence of diluent water. The color transfer to the fruit is chiefly from the aqueous portion of the emulsion and as the dye is removed from this by the passage of fruit through the emulsion, fresh dye and fresh first solvent are transferred from the drops of suspended oily matter constituting the first solvent.

The present process of the present invention also contemplates the step of dissolving a portion of wax, preferably about 10 percent of the weight of the mixed solvents in the mixed solvents. This produces in the final emulsion more color in the aqueous solution and less in the suspended droplets. By this means dilutions of one part of concentrate to 100 parts of water can be made to color fruit at from 90° F. to 100° F. in a short period of time, for example, five or six minutes. Where wax is included as an ingredient in the treating liquid, a very thin film of wax is left on the surface of the fruit and this thin film will enable a better adherence of wax to the fruit in the subsequent process of waxing.

While I have in the above specification disclosed what I believe to be a preferred and practical embodiment of my process for coloring citrus fruits, it will be understood by those skilled in the art that the proportions of the several ingredients and sequence of the steps may be varied without transcending the spirit and scope of the invention as defined in the appended claims.

What I claim is:

1. Process for coloring citrus fruits comprising providing the following dye concentrate solution: a mixture of a solution of an oil dye in a water-insoluble solvent selected from the following group: chloroform, carbon tetrachloride, dichlorethane, trichlorethane, tetrachlorethane, pentachlorethane, dichlorethylene, trichlorethylene, perchlorethylene and dichlorobenzene, with a water-soluble solvent selected from the following group: butanol, ethers of mono-ethylene glycol, ethers of diethylene glycol, cyclohexanol, diacetone alcohol, ethyl alcohol, propyl alcohol; said mixed oil-dye solutions being dissolved in a soap solution, emulsifying this dye concentrate solution with water, and exposing the citrus fruit surfaces in contact with said emulsion at a temperature range of from 90° F. to 100° F., until the desired degree of color has been imparted to the fruit.

2. Process for coloring citrus fruits comprising providing the following dye concentrate solution: a mixture of a solution of an oil-dye in a water-insoluble solvent selected from the following group: chloroform, carbon tetrachloride, dichlorethane, trichlorethane, tetra chlorethane, pantachlorethane, dichlorethylene, trichlorethylene, perchlorethylene and dichlorobenzene with a water-soluble solvent selected from the following group: butanol, ethers of mono-ethylene glycol, ethers of diethylene glycol, cyclohexanol, diacetone alcohol, ethyl alcohol, propyl alcohol; said mixed oil-dye solutions being dissolved in a soap solution, said dye concentrate solution including a proportion of dissolved wax, emulsifying the dye concentrate solution with water, and exposing the citrus fruit surfaces in contact with said emulsion at a temperature range of from 90° F. to 100° F., until the desired degree of color has been imparted to the fruit.

LONGFIELD LONGFIELD-SMITH.